Dec. 24, 1968     L. C. YOUNG     3,417,767

SELF-RESTARTING SUPERSONIC INLET

Filed June 13, 1966     6 Sheets-Sheet 1

INVENTOR.
LOUIS C. YOUNG

BY Charles F. Dinkler

ATTORNEY

Dec. 24, 1968     L. C. YOUNG     3,417,767
SELF-RESTARTING SUPERSONIC INLET

Filed June 13, 1966     6 Sheets-Sheet 2

INVENTOR.
LOUIS C. YOUNG
BY
Charles F. Diechler
ATTORNEY

Dec. 24, 1968  L. C. YOUNG  3,417,767
SELF-RESTARTING SUPERSONIC INLET
Filed June 13, 1966  6 Sheets-Sheet 5

INVENTOR.
LOUIS C. YOUNG
BY
Charles F. Dischler
ATTORNEY

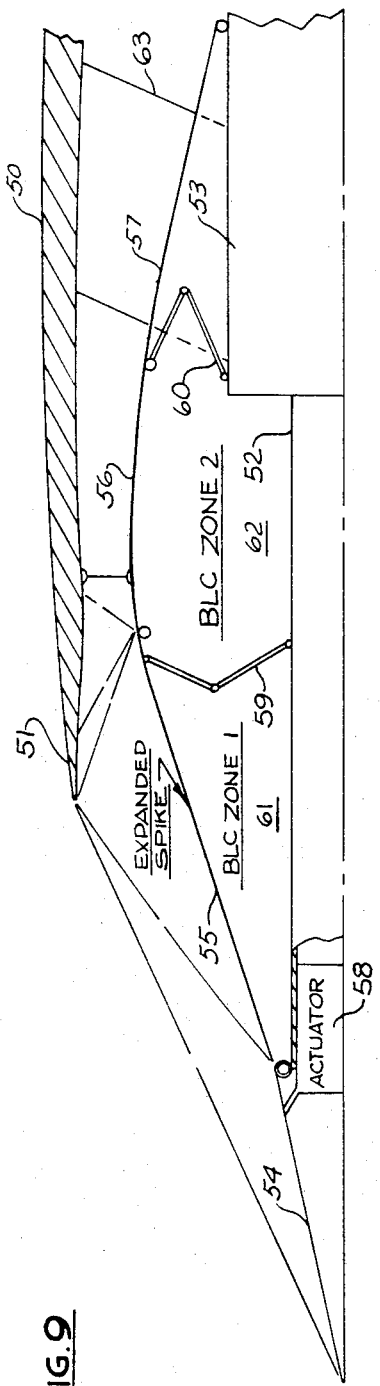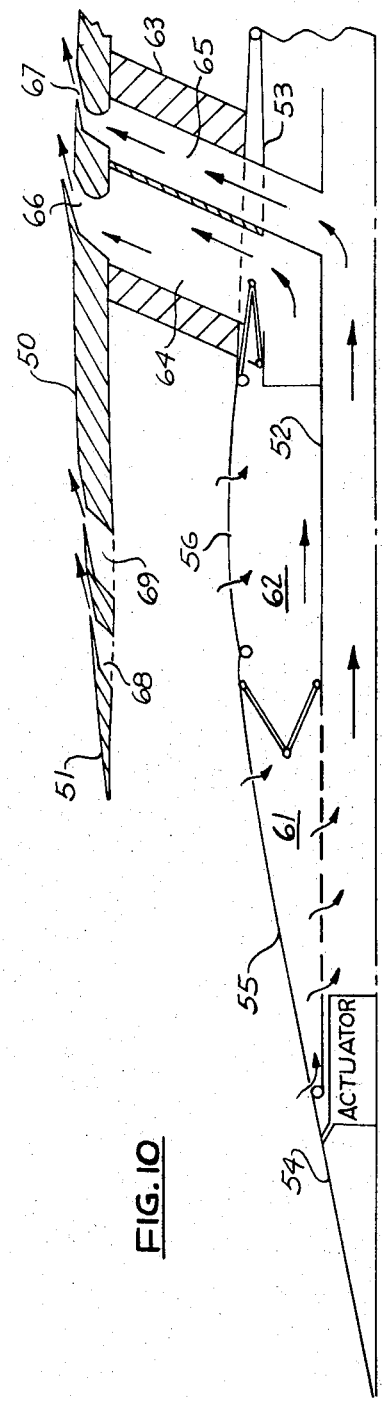

United States Patent Office 3,417,767
Patented Dec. 24, 1968

3,417,767
SELF-RESTARTING SUPERSONIC INLET
Louis C. Young, Palos Verdes Peninsula, Calif., assignor to North American Rockwell Corporation, a corporation of Delaware
Filed June 13, 1966, Ser. No. 557,275
11 Claims. (Cl. 137—15.2)

ABSTRACT OF THE DISCLOSURE

A high performance mixed compression air inlet for a supersonic aircraft having a movable ramp with a plenum chamber transmitting ramp boundary layer bleed air from a downstream high pressure region of the ramp to an upstream low pressure region on the ramp to cause boundary layer separation and aerodynamically reduce the flow area at the inlet lip thereby effectively increasing the internal contraction ratio to permit restarting of the inlet without physical change in the structure geometry.

---

This invention relates to a supersonic ram-air inlet wherein control of airflow conditions involves the use of movable ramp surfaces. More particularly, the invention relates to a supersonic external-internal compression air induction system capable of high pressure recovery in the so-called started or design condition that is capable of restarting without adjustment of the movable ramp surfaces of the inlet in the event that the internal shock system is disrupted and an unstart occurs.

In turbo-jet, turbo-fan, and ram-jet engines the thrust produced by the engine is a direct function of the weight-rate of airflow through the engine. This weight-rate of airflow is, in turn, proportional to the total pressure of the air in the duct leading to the engine. Most engines require subsonic air velocities at the entrance to the engine. Air cannot be decelerated from supersonic to subsonic speeds without passing through one or more flow discontinuities known as shock waves. The total pressure loss through a shock wave is a function of $M \sin \theta$ where M is the Mach number approaching the wave and $\theta$ is the shock wave angle relative to the flow direction approaching the shock wave. At velocities above Mach 2 achieving high total pressure recovery with low drag necessitates accomplishing part of the supersonic deceleration behind the inlet lip and within the variable convergent area flow passage that extends aft of the cowl lip and terminates in a minimum area throat section. An external compression surface, generally including a fixed and a variable ramp, initiates an external oblique shock system to decelerate the flow from the free stream Mach number $M_0$ to a lower Mach number $M_1$ at the cowl lip station. During started operation a system of internal oblique shock waves will further decelerate the flow to a low supersonic Mach number $M_t$ at the minimum area throat section to reduce the total pressure losses through the terminal normal shock with completes the transition to subsonic speeds. The internal contraction ratio, $A_t/A_1$ (throat area/inlet lip area) for an engine air inlet duct approaches the isentropic flow area ratio, $A^*/A$, when $M=M_1$ and $M_t$ approaches unity.

The isentropic flow area ratio, $A^*/A$ for a supersonic inlet may be defined as the throat to inlet area ratio for a given inlet Mach number that is required to produce an isentropic compression of the air within the inlet duct between the inlet and the throat stations. This ratio is expressed as $$A^*/A = M \frac{\gamma + \frac{1}{2}}{1 + \gamma - \frac{1}{2}M^2} \frac{\gamma + 1}{2(\gamma - 1)}$$

where $\gamma$, the ratio of specific heats, is 1.4 for air and $M=M_1$ and is greater than unity.

The total pressure recovery of the inlet is very dependent upon the location of the terminal normal shock. The equation for the static pressure ratio across the normal shock is $$\frac{P_y}{P_x} = \frac{2\gamma}{\gamma + 1}(M + \Delta V/a)^2 - \frac{\gamma - 1}{\gamma + 1}$$

where $P_y$=static pressure behind the normal shock,
$P_x$=static pressure ahead of the normal shock,
$M$=Mach number approaching the shock wave,
$\Delta V$=velocity of shock wave, and
$a$=local speed of sound At design, steady state conditions the normal shock is located just downstream of the inlet throat and is stationary relative to the inlet so that $\Delta V=0$ in the above equation. A change in the downstream flow conditions that increases $P_y$ will create a $\Delta V$ to move the shock forward and out of the inlet throat. As the normal shock moves forward of the throat the Mach number forward of the shock increases with a resulting increase in total pressure losses through the shock which, in turn, reduces the flow density at the throat. The decreasing density limits the flow capacity at the inlet throat and this choking forces the normal shock out past the inlet lip and into an unstarted condition. The term "started condition" of an inlet may be defined as stable operation in the normal design condition when the flow is supersonic at the cowl inlet lip station and the terminal normal shock wave is usually located downstream of the inlet throat, i.e., the inlet minimum cross-sectional area. An "unstarted condition" is any operative inlet condition other than a started condition. When an inlet is "unstarted" the terminal normal shock wave is usually forward of the throat and may be outside the inlet. The inlet can be unstarted by any change in external flow conditions which decreases $M_1$ (decreasing Mach number $M_0$ or pitch or yaw at constant $M_0$) or an increase in back pressure due to inlet bypass door closure or engine airflow reduction. This, in turn, causes the throat Mach number to approach unity and forces the creation of a normal shock in the unstable region forward of the inlet throat.

The expelled normal shock has an approach Mach number of $M_1$ which is much higher than the design throat Mach number. The resulting high total pressure loss forces the normal shock far out on the compression surface to spill the excess airflow. For inviscid flow conditions the normal shock will remain forward of the lip if the internal contraction ratio, $A_t/A_1$, is less than the isentropic ratio, $A^*/A$, for the subsonic Mach number behind the shock. This is a highly unstable and undesirable condition since the high total pressure loss through the strong external normal shock reduces air density and limits the inlet mass flow even with sonic flow at the inlet throat. In a conventional inlet the normal shock cannot be swallowed to restart the inlet until the throat area is increased to bring the internal contraction ratio $A_t/A_1$ to the particular isentropic contraction ratio $A^*/A$ for the post-shock Mach number. The magnitude of the internal contraction ratio adjustment will approach the ratio of the level of curves $B/A$ on FIGURE 3. Optimum recovery dictates operation at contraction ratios approaching isentropic $A^*/A$ curve A on FIGURE 3. Inlet restarting requires operation above the Kantrowitz-Donaldson subsonic $A^*/A$ curve B. Since this restarting at low pressure recovery also requires a mass flow equal to the design mass flow rate, the increasing duct exit volumetric airflow rate conventionally dictates a large by-pass exit area to handle the excess air flow that the engine cannot absorb. Such inlet restarting thus normally is accomplished by a lengthy and complex sequencing of the variable throat area and by-pass area opening to return to the design restarted condition without encountering the danger regions of extreme supercritical shock-boundary layer interaction and sub-critical buzz.

Boundary layer separation can be utilized to alter the effective flow path of an inlet duct. The self restarting inlet of the present invention operates on the principle of massive boundary layer separation on the external compression surface to spill part of the excess airflow and increase the effective internal contraction ratio during unstarted operation to permit swallowing of an expelled normal shock. The separated boundary layer reduces the flow area at the inlet lip station but bleeding the boundary layer behind the lip leaves the throat area almost unchanged. This results in an increase in the effective $A_t/A_1$ ratio. When the normal shock reaches or passes behind the throat the decreased static pressure in the converging region permits boundary layer reattachment and the resulting return to the normal design internal flow conditions will re-establish the started inlet shock geometry. Inlet restarting at contraction ratios approaching the supersonic isentropic ratio can be achieved by means of the present invention. The pressure recovery after restart at fixed geometry, in accordance with the present invention, has been experimentally determined, under certain conditions, to be within 2 percent of the maximum reported recovery measured at the particular Mach number.

The self restarting principle of this invention thus broadly involves an inlet geometry arrangement including means creating an outward flow of bleed air, during unstarted operation, far forward of the inlet cowl lip to generate additional shock waves and spill excess airflow. Such bleed flow means includes a boundary layer control system designed for controlled bleed flow reversal on an exterior compression ramp and selective boundary layer bleed on the internal ramps and walls of the inlet duct. More particularly, the present invention contemplates an air inlet comprising a compression surface projecting externally to create oblique shocks which partially decelerate and compress the ingested airflow; internal, contoured ramps designed for further oblique shock compression to a throat Mach number near unity; an external compression surface boundary layer control system consisting of a porous boundary layer bleed surface, at least one plenum chamber with a suitable bleed flow exit and means for creating a flow of air outwardly through a portion of the external compression surface to cause boundary layer separation. In addition, an operative variable geometry air inlet system in accordance with the present invention would conventionally include means for controlling the inlet geometry and internal contraction ratio to accommodate changes in Mach number and direction of the flow approaching the inlet; a by-pass system to spill the duct exit flow in excess of the engine capacity; and the necessary control system for the variable geometry components.

Accordingly, it is an object of the present invention to provide a means for aerodynamically adjusting the internal contraction ratio and flow conditions to minimize the probability of unstarting and to rapidly and automatically restart the inlet without inlet duct geometry changes, in the event of an unstart, when the unstarting disturbance has been removed.

It is also an object of this invention to accomplish automatic restarting of the inlet at pressure recovery levels comparable to conventional inlets that do not incorporate this self restarting principle.

It is a further object of this invention to provide a means for boundary layer bleed flow reversal and boundary layer separation on the external primary compression surface which alters the internal aerodynamic flow path and to utilize such flow reversal and separation in combination with bleed through the aft ramp, cowl, and other inlet walls to prevent the expulsion of the terminal normal shock in the event of moderate destabilizing effects.

It is a further object of this invention to provide a compression surface bleed system arrangement that, in the event of a strong destabilizing disturbance, will transmit a pressure pulse forward through the compression surface bleed plenum chamber to modify the external shock system by means of boundary layer separation on the external compression surface and thereby decelerate the expelled normal shock and slow the rate of pressure decay at the engine inlet. This reduced rate of pressure decay during unstart facilitates rapid corrective action by the inlet bypass and engine fuel control systems.

Figure 3:
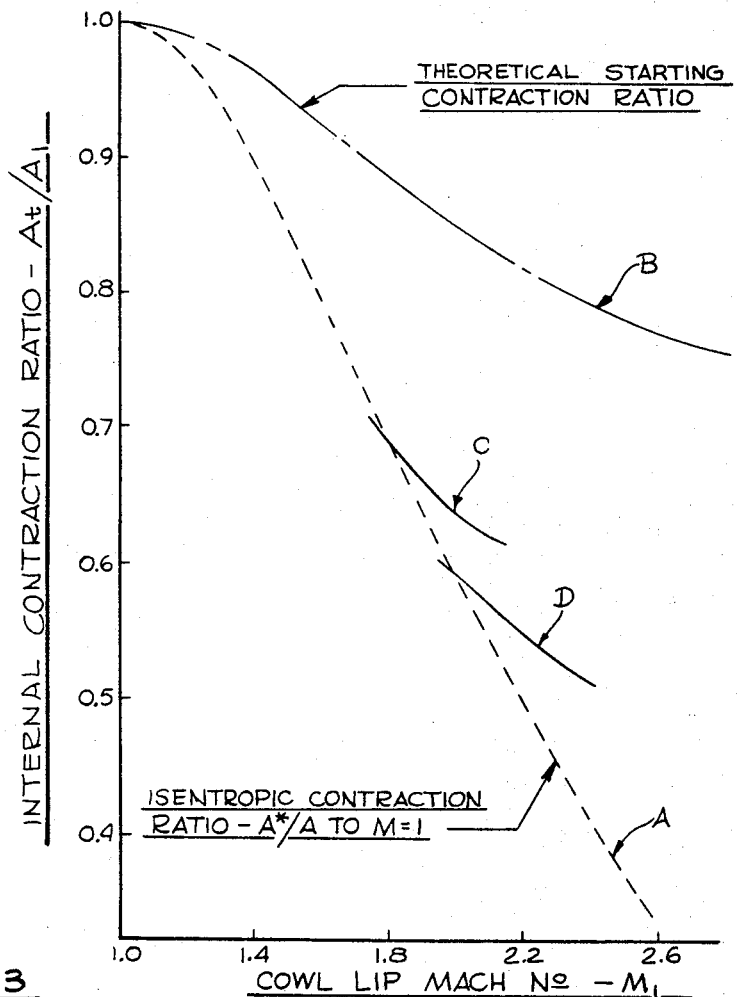

FIGURE 3 presents curves of the required started and restarting internal contraction ratios vs. lip station Mach number for inviscid flow for conventional inlets and several curves of experimental test results of models of the present invention.

Figure 4:
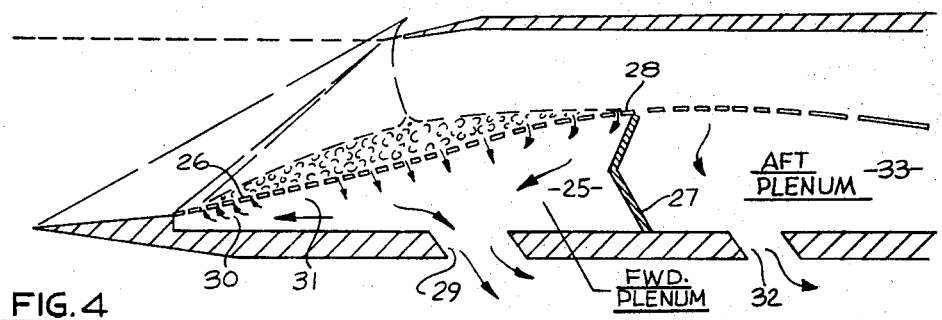

FIGURE 4 schematically depicts the bleed flow reversal arrangement of the present invention for aerodynamically adjusting the internal contraction ratio by controlled compression surface boundary layer separation.

Figure 5:
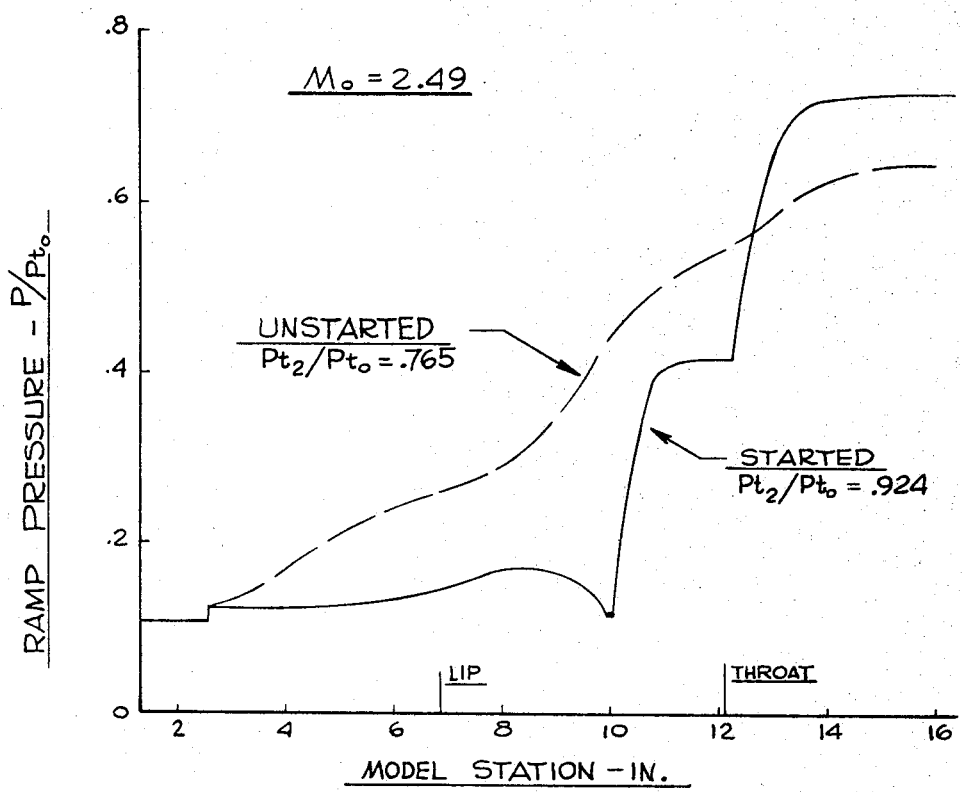

FIGURE 5 graphically illustrates the ramp pressure ratios $P/Pt_0$ as a function of the distance along the inlet ramp for a wind tunnel test model for started and unstarted conditions.

Figure 6:
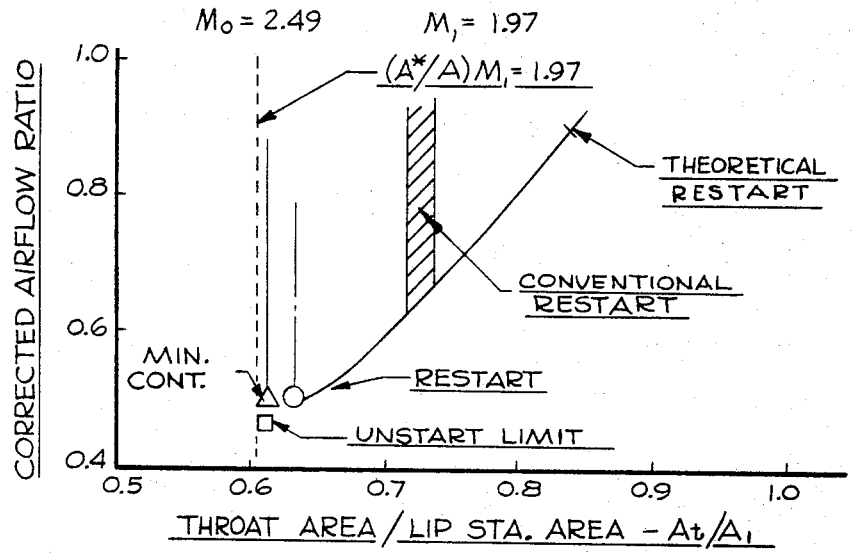

FIGURE 6 is a curve of the operational limits of an inlet based on the parameters of corrected volumetric airflow vs. internal contraction ratio at a constant cowl lip station Mach number.

Figure 7:
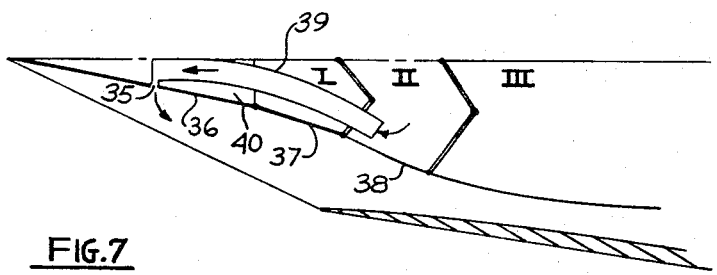

FIGURE 7 is a schematic cross-sectional plan view of another embodiment of a two-dimensional self starting inlet in accordance with the present invention.

Figure 8:
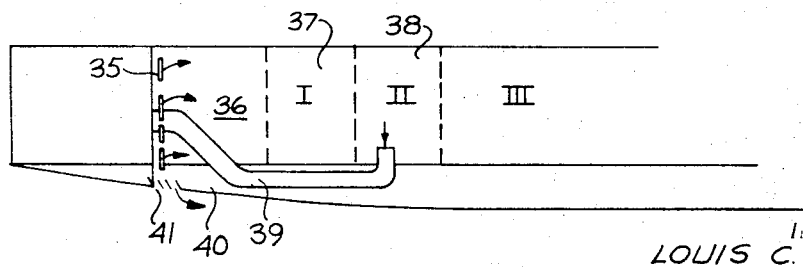

FIGURE 8 is a schematic cross-sectional elevational view of the embodiment of FIGURE 7.

FIGURE 9 is a schematic longitudinal half cross-sectional view of an axisymmetric self-starting inlet in accordance with the present invention illustrating the inlet in a started condition.

FIGURE 10 is another schematic longitudinal half cross-sectional view of the axisymmetric inlet of FIGURE 9 showing the inlet with a collapsed centerbody to illustrate the variable geometry and BLC bleed features of this inlet.

Figure 11:
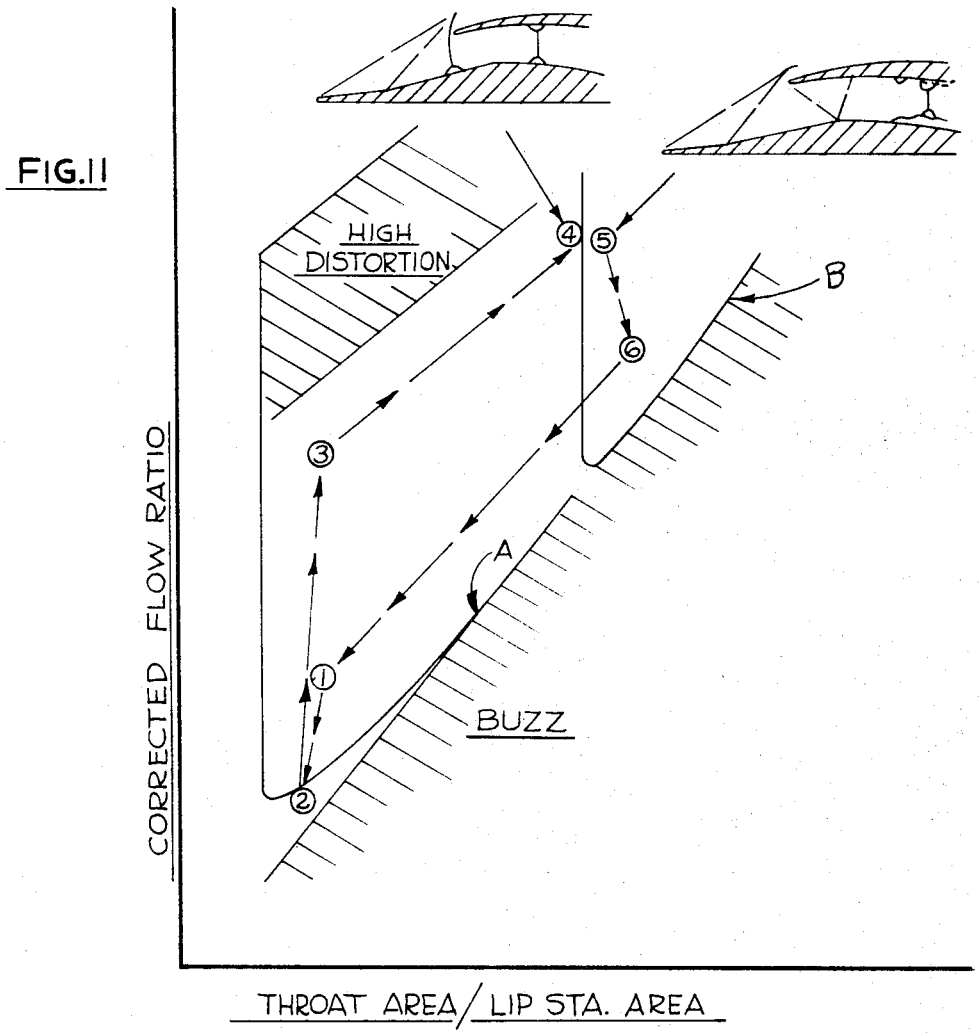

FIGURE 11 is a curve of the operational limits for a conventional inlet in terms of corrected airflow vs. internal contraction ratio at a constant cowl lip Mach number.

Figure 12:
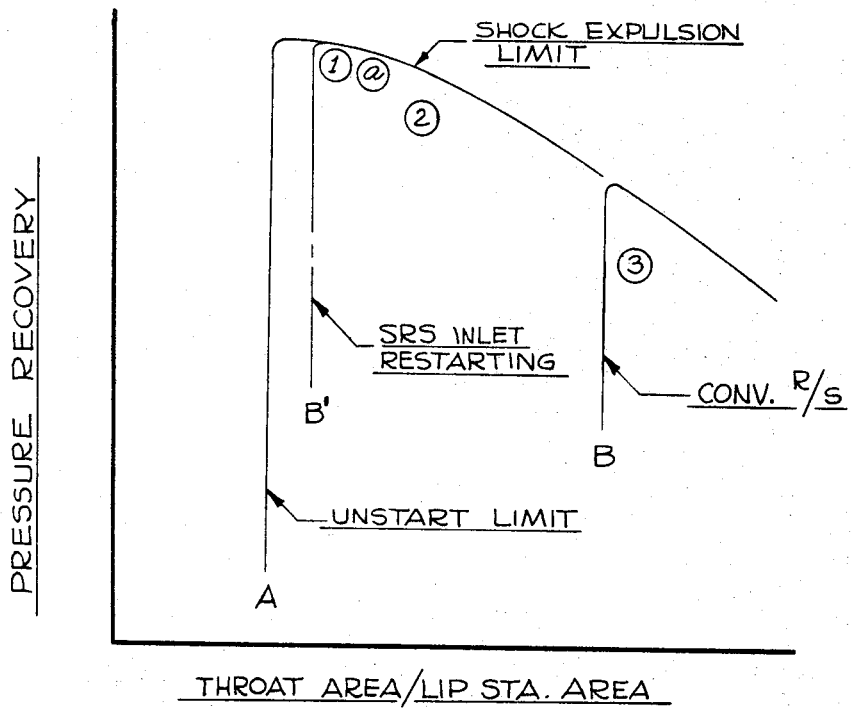

FIGURE 12 presents curves of pressure recovery vs. internal contraction ratio for a conventional inlet and the self-restarting inlet of the present invention.

Figure 1:
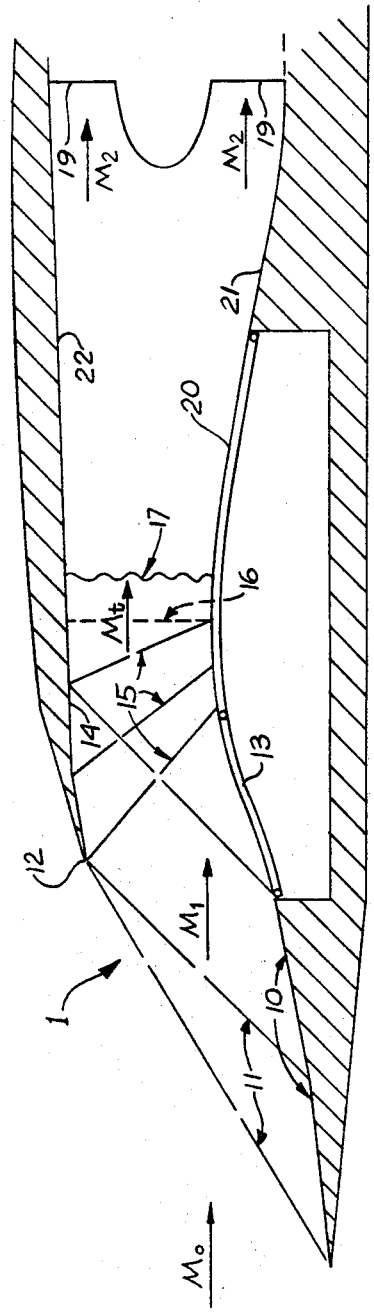
FIGURE 1 is a schematic partial cross-section of a supersonic external-internal compression air inlet in a normal started flow condition.

Referring to the drawings, FIGURE 1 illustrates design operation of a supersonic external-internal compression inlet 1. The external compression surfaces 10 generate oblique shocks 11 which decelerate the ingested airflow from the inlet approach Mach number, $M_0$, to a lower Mach number, $M_1$, at the plane of the cowl lip leading edge 12. The internal supersonic compression surfaces 13 and 14 generate internal oblique shocks 15 which further decelerate the flow to a low supersonic Mach number $M_t$, at the throat or minimum area station 16. The transition from supersonic to subsonic flow occurs in the terminal normal shock 17. The completion of the diffusion process to the duct exit/engine inlet 19 and corresponding Mach number, $M_2$, is controlled by the contour of the subsonic diffuser walls 20, 21 and 22. The objective of this diffusion process is to achieve a high pressure recovery, $Pt_2/Pt_0$, wherein $Pt_2$ is defined as the engine inlet total pressure and the freestream total pressure, $Pt_0$, is defined by the equation, $$Pt/P = (1 + \gamma - \tfrac{1}{2}M^2)\frac{\gamma}{\gamma-1}$$

In this equation $Pt$=total pressure and $P$=static pressure. The flow compression process can be divided into four phases, (a) external supersonic compression between $M_0$ and $M_1$, (b) internal supersonic compression from $M_1$ to $M_t$ at the inlet throat, (c) the terminal normal shock, and (d) the subsonic diffusion process. The oblique shock compression processes of (a) and (b), above, are normally accomplished at nearly isentropic conditions. Processes (c) and (d) are closely interrelated in that the location, approach Mach number, and flow processes through the terminal normal shock are uniquely dictated by the contour and area ratio of the subsonic diffuser, and the diffuser exit Mach number, $M_2$.

The expression for the isentropic flow area ratio, previously defined, and other equations or tables describing the static pressure and temperature changes with Mach number facilitate analysis of flow conditions between two points if the areas at both points and the Mach number at either station are known. Non-isentropic processes can be approximated by correcting the downstream isentropic ratio $A^*/A$ by the total pressure ratio between the flow stations under study. The commonly used corrected airflow function may be expressed as $$\omega\sqrt{\frac{\theta}{\delta t}} = KA(A^*/A)$$

where $\theta$ is the ratio of total temperature to the reference temperature and $\delta t$ = ratio of total pressure to sea level standard pressure, and $K = 0.343$ lb./sec. in.$^2$ or 49.3 lb./sec. ft.$^2$. Turbojet or turbofan engine corrected airflow rates are functions of engine speed and total temperature. The engine corrected airflow plus the by-pass exit area and flow rate will define the diffuser exit Mach number $M_2$ and shock position. It should be noted that the above engine corrected flow is relatively insensitive to pressure recovery.

An increase in back pressure (decreasing duct exit corrected flow) can force the normal shock out of the inlet throat. The normal shock cannot stabilize in the convergent portion of the inlet; the upstream Mach number increases with forward movement, this increases the normal shock total pressure loss, the resulting increase in static pressure downstream of the normal shock dictates a further forward movement of the shock. In the equation for the static pressure ratio across the normal shock;

$$\frac{P_y}{P_x} = \frac{2\gamma}{\gamma+1}(Mx+\Delta V/a)^2 - \frac{\gamma-1}{\gamma+1}$$

where $x$ and $y$ denote conditions upstream and downstream of the shock, the decreasing $P_x$ and increasing $M_x$ necessitates an accelerating outward movement until the shock emerges from the cowl lip plane and external spillage reduces $P_y$ to stabilize the shock position.

Figure 2:
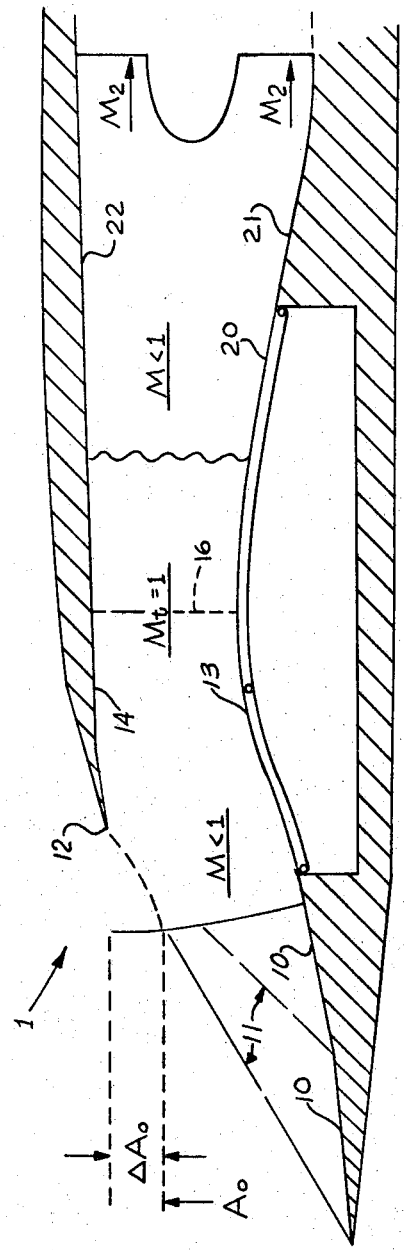
FIGURE 2 is a schematic partial cross-section as in FIGURE 1 illustrating an unstarted condition of the inlet configuration of FIGURE 1 for inviscid flow conditions.

FIGURE 2 illustrates the unstarted inlet. The subsonic Mach number behind the external normal shock is uniquely defined. The subsonic Mach number at the inlet lip plane is a function of the internal contraction ratio and maximizes with Mach 1.0 at the throat and the Mach number at the lip defined by $A_t/A_1 = A^*/A$. The normal shock must stay forward of the cowl lip when the Mach number at the cowl lip is greater than the Mach number behind the normal shock. From a theoretical standpoint, the external normal shock cannot be swallowed until either or both the inlet lip flow area and throat area are increased to bring the effective value of the $A_t/A_1$ ratio above the effective value of the isentropic flow area ratio $A^*/A$ behind the normal shocks.

The theoretical limits for started operation and restarting are given in FIGURE 3. Lower curve A presents the area ratio for isentropic contraction to Mach 1 at the throat vs. the lip station Mach number, $M_1$. Upper curve B gives the shock swallowing contraction ratio, $A^*/A$ in the subsonic flow behind a normal shock with an upstream Mach number=$M_1$. The ratio of these curves are equal to the normal shock total pressure recovery at $M_1$. The upper curve, sometimes known as the Kantrowitz-Donaldson ratio, is also used to define the permissible tunnel blockage area for supersonic wind tunnel tests.

The preceding discussion generally ignored the effect of the compression surface boundary layer. The prevention of boundary layer separation is a major concern in supersonic inlet design and operation. If the boundary layer is exposed to a static pressure higher than the total pressure in the lower energy regions of the boundary layer the boundary layer can separate from the wall and seriously disrupt the inlet shock system. The limiting static pressure rise ratio (static pressure behind normal shock/static pressure ahead of normal shock) for turbulent boundary layer incipient separation increases slightly with Mach number but will average about 2.5 for the Mach number range herein under consideration (Mach numbers of from 1.5 to 3.0). The static pressure behind the throat normal shock will range from about 10 times ambient pressure at Mach 2.5 to over 20 at Mach 3.0. The usual method by compression surface boundary layer control is by means of the so-called porous surface bleed method. The lower velocity boundary layer nearest the compression surface is removed through a carefully selected pattern of bleed holes in the surface. The bleed air usually flows into a bleed plenum chamber with the chamber pressure and the exit flow rate therefrom being controlled by the area of the chamber exit orifice. For good inlet shock structure and performance the low energy boundary layer nearest the surface must be removed in the regions where static pressure rise ratios above a value of two are anticipated. To minimize bleed flow and the resultant drag due to bleed air momentum loss, the bleed system has been divided into as many as five compartments on some inlets. These bleed compartments separate the several bleed pressure zones to achieve the highest possible pressure level in each bleed compartment adjacent to a particular pressure level on the external surface during started (design) operation. While specified in the above discussion as being applied to the ramp compression surface, the porous bleed method boundary layer control is equally applicable to the other walls, or sideplates, of an engine air inlet for optimum inlet performance.

If the normal stock is expelled the compression surfaces will be exposed to the much higher and somewhat more uniform static pressure of the subsonic flow field behind the normal shock. The static pressure rise ratio is generally sufficient to separate the compression surface boundary layer from its adjacent wall if the bleed exit areas are inadequate to remove the low energy boundary layer air. This boundary layer separation can create an aerodynamic flow path that can be greatly different from the flow path defined by the physical walls of the inlet. If the boundary layer separation occurs sufficiently forward of the cowl lip to create additional oblique shocks forward of the normal shock, part of the airflow will be spilled around the inlet. Utilizing the above principles, inlets have been restarted in accordance with the present invention at geometry and flow conditions approaching the physical internal contraction ratio isentropic curve A on FIGURE 3 rather than the normal restarting curve B. The operative mechanism is an effective aerodynamic flow path defined by the separated boundary layer having an effective contraction ratio that is equal to or greater than the theoretical or Kantrowitz-Donaldson curve with an actual physical geometric contraction ratio at a much lower level. This effect has approximately halved the inlet variable geometry changes required for restarting of an inlet not specifically designed for self-restarting. Utilization of a by-pass exit may still be required or desirable to assist in restarting in some instances.

It has been analytically and experimentally determined that if the initiation of the boundary layer separation is located sufficiently forward of the inlet lip to significantly alter the external shock system and spill large percentages of the design airflow, and if an especially designed bleed system is provided between the cowl lip and throat, the inlet can be started or restarted at geometric contraction ratios approaching the high performance isentropic $A^*/A$ curve A on FIGURE 3. FIGURE 4 illustrates the separated boundary layer contour as obtained from Schleiren photographs on actual wind tunnel test runs of an embodiment of the present invention. FIGURE 5 presents the measured compression surface static pressures for started and unstarted operation of the embodiment of FIGURE 4. As shown in FIGURE 4 a plenum chamber 25 is formed extending from the start of the second ramp 26 to the flexible bulkhead 27 under the throat ramp panel 28. The BLC bleed exit area 29 from chamber 25 was carefully controlled to maintain the plenum chamber pressure just below the static pressure on the first ramp. The attachment point of the bulkhead is selected to achieve rapid response to strong normal shock disturbances. A movement of the normal shock forward of the bulkhead exposes the plenum chamber to the high static pressure behind the normal shock which rapidly increases the plenum chamber pressure and bleed flow rate. The bleed flow direction through the porous ramp panel reverses when the plenum pressure exceeds the static pressure on the adjacent ramp external surface ahead of the normal shock. The resulting boundary layer separation and additional external oblique shocks spill some of the airflow and reduces the effective flow area at the inlet lip. A comparison of the steady state unstarted ramp surface and plenum chamber pressures indicates BLC bleed outflow at 30 due to plenum pressure exceeding the surface pressure, essentially null flow at 31 due to the approximately equal pressures, and increased bleed flow into plenum 25 in the aft ramp region. The ratio of the BLC bleed plenum chamber pressure for started and unstarted operation illustrates the increased bleed flow through the sonic bleed exit 29. The bleed flow through the sideplates and cowl (not shown) is also increased by the increased average surface pressure and the higher flow coefficient through the bleed holes with a subsonic approach flow. This higher bleed flow between the cowl lip and throat removed most of the compression surface boundary layer, opened up the effective area at the inlet throat, and increased the effective internal contraction ratio. For the example shown, the exit back pressure forced a subsonic throat Mach number, but the inlet restarted automatically when the back pressure was decreased.

While the means for effecting boundary layer separation to alter the aerodynamic flow path is generally described herein in terms of a boundary layer bleed flow reversal technique, it is to be understood that it is equally within the concept of this invention to utilize engine bleed-off air or ram air to effect such boundary layer separation.

The stable unstarted operation data on FIGURE 5 were achieved by increasing the back pressure to force the normal shock out of the inlet throat and often the inlet was forced into buzz (i.e., oscillation of the normal shock longitudinally in the duct). Both visual (Schleiren) observation and dynamic pressures at the inlet throat showed several slow pulse unstarts and restarts before the final unstart. These data indicate that this inlet has a large tolerance to small or moderate normal shock transients. The warning pressure pulses can be used to activate a normal shock position sensor and initiate a by-pass opening to prevent further forward shock movement. This pulse action resulted from the initial movement of the normal shock forward of the plenum chamber bulkhead 27 which sent a pressure pulse forward through the plenum chamber to generate an additional external oblique shock while at the same time a concentrated bleed from exit 32 in aft plenum 33 just behind the bulkhead 27 halted normal shock movement.

Experimental starting contraction ratios for the embodiment of FIGURE 4 of this invention are shown by curves C and D on FIGURE 3. The geometric internal contraction ratios, $A^*/A$, were very near the curve of supersonic isentropic compression to Mach 1.0 for the Mach number at the inlet lip station, $M_1$. The test Mach numbers range from 2.20 to 3.1 for curves C and D. As explained previously, the effective aerodynamic contraction ratios achieved by several arrangements of this invention and shown by curves C and D on FIGURE 3 approximated the theoretical starting ratios of curve B.

The significance of this improvement in starting contraction ratio is graphically illustrated by the comparison shown on FIGURE 6. This is a presentation of corrected (volumetric) airflow vs. internal contraction ratio at a constant lip station Mach number. This figure is essentially a cross-plot of FIGURE 3 for a particular $M_1$. The triangular symbol denotes the minimum corrected flow (maximum recovery) point with the minimum operating throat area. The inlet was not restartable at this throat area. The square symbol shows the minimum stable corrected flow during unstarted operation, the inlet buzzed at attempts to set lower corrected flows. The circle symbol illustrates the minimum corrected flow (peak recovery) for a self-restarting throat area. The cross hatched area represents the trends of starting contraction ratios for conventional supersonic inlets that were not designed specifically for self restarting. The cross symbol denotes the theoretical starting conditions, $A_t/A_1$ equal to $A^*/A_1$ at the subsonic Mach number behind a normal shock with an approach Mach number=$M_1$, and a corrected flow determined by the sonic flow rate through the inlet throat and an assumed 3 percent pressure recovery loss in the subsonic diffuser. The engine air demand corrected flow, which is relatively insensitive to pressure recovery, is normally equal to or less than the minimum airflow. Conventional inlets require large by-pass exit flows for restarting and the large by-pass doors and actuators increase the weight of the propulsion system.

The starting pressure recoveries for the several inlet types are indicative of the engine thrust levels at restart for the several inlets. When we consider the by-pass drag associated with the excess flows illustrated on FIGURE 6 we realize the performance losses which result during the restart process with conventional inlets. The resulting deceleration greatly increases the fuel usage on a typical cruise mission for restarting of such conventional inlets.

FIGURES 7 and 8 illustrate another embodiment of the invention as proposed for application to a large existing Mach 3 research aircraft. In this configuration a bleed slot 35 is located at the leading edge of the second fixed ramp 36 with four or more BLC plenum chambers located behind the second fixed ramp 36 and movable ramps 37 and 38. Slot 35 is connected by a suitable conduit member 39 to plenum II behind ramp 38. In this modification, plenums I, II and III are existing BLC plenums, while plenum 40 is an added plenum having a small auxiliary exit 41 to control the pressure therein. During started inlet operation a small bleed flow would take place from BLC plenum II into plenum 40 and would leak out through the auxiliary exit 41, which is also connected to conduit 39 and which is sized to keep the pressure in plenum 40 below the surface pressure on fixed ramp 36. At unstart the pressure rise in BLC plenum II will create a bleed outflow through slot 35 to separate the boundary layer on ramp 36 for self-restarting of the inlet.

FIGURES 9 and 10 disclose the concept of the invention as applied to an axially symmetric inlet. In these illustrations, FIGURE 9 is a high speed started configuration and FIGURE 10 is a somewhat lower speed configuration in an unstarted mode. Such an inlet could utilize a three section expandible spike with an interlocking leaf construction. This embodiment comprises an outer annular nacelle 50 with a cowl 51. Support tubes 52 and 53 are located within the nacelle along its longitudinal axis. These tubes provide the supporting structure for fixed cone 54, movable curved ramps 55, 56 and 57, and actuator 58. Collapsible or movable bulkheads 59 and 60 divide the interior of the expandable spike into boundary layer control zones by forming plenums 61 and 62. The spike is supported from nacelle 50 by three or more struts 63. These struts include conduits 64 and 65 connecting plenums 62 and 61 with outlets 66 and 67, respectively, whereby the BLC bleed off may be dumped overboard as required. Cowl 51 further includes bleed exits 68 and 69. The placement of bulkhead 59 and the communication between BLC Zone 1 and the concentrated bleed slot at the forward hinge will create the self-restarting feature of this invention.

FIGURE 11 presents the operational limits for a conventional inlet. Curve A shows the limit of correction flow vs. internal contraction ratio for a particular $M_1$; this curve moves down and to the left for increasing $M_1$, up and to the right for decreasing $M_1$. Curve B defines the region for restartable operation; these curves A and B will merge at some lower supersonic Mach number. A typical operationg point is illustrated as point (1) in the region between curves A and B where both started and unstarted operation is possible. The inlet will unstart when curve A moves to the right across point (1) due to a decrease in $M_1$ (decreasing $M_0$ or a pitch or yaw change that increases the external compression) or a reduction in duct exit air demand that moves the operating condition to point (2). The initial corrective action must be an increase in by-pass exit area to prevent or eliminate an unstable buzz condition as illustrated by the movement to point (3) on the figure. This results in a supercritical unstarted condition—the subsonic flow behind the external normal shock accelerates to Mach 1 at the throat and then accelerates to a supersonic Mach number before a second, internal, normal shock which may occur at Mach numbers approaching $M_1$. Since this internal shock is adjacent to a thick internal boundary layer the shock can be very unstable. For this reason a shock limit control of by-pass area must be employed during the throat area opening process between (3) and (4).

The inlet restart occurs between points (4) and (5). This can be a violent maneuver. The volumetric airflow and pressure recovery are relatively unchanged between these points but the mechanism is different. The total pressure losses at point (4) are shared between two normal shocks, and the throat boundary layer bleed removes the separated boundary layer behind the external normal shock. At point (5) the throat flow is almost isentropic and total pressure losses as high as 50–60% $Pt_0$ must occur through the internal normal shock and the resultant turbulent mixing of boundary layer and core flow. A rapid by-pass closure is needed after point (5) to decrease the volumetric flow at point (6), but the operating point must not be allowed to go below curve B or buzz may recur. The shock position must also be controlled during the throat closure period between point (6) and return to point (1).

The entire sequence of restarting a conventional inlet, as set forth above, may take up to 10 seconds depending upon Mach number, internal contraction ratio, and sophistication of the inlet control system. During this unstart-restart sequence the other inlets of a multi-inlet vehicle must be operated at off-design conditions to insure that these inlets are not unstarted by the destabilizing moments induced by the unstarted inlet. These effects create a large thrust loss which results in a loss in speed and excess fuel usage to accelerate back to the design cruise speed. The fuel reserves needed for such emergencies will add to the direct operating costs.

Typical curves of pressure recovery vs. internal contraction ratio are given on FIGURE 12. Curve A is the limiting started operation curve first presented on FIGURE 11. Curves B and $B^1$ illustrate the limits of restarting for conventional and self-restarting inlets respectively. The symbols represent the following control points for a conventional inlet: (1) High Performance—desired cruise operation with allowance for slow pitch or yaw transients or slow engine by bypass transients; (2) Normal Operation—for accelerating flight or for somewhat more severe pitch/yaw or engine transients; and (3) Safe Operation—a restartable condition for prevention of catastrophic effects to the air vehicle in the event of gusts, shock waves from passing aircraft, hard augmentor light-offs, etc. A single control point (a) for the self-restarting inlet between points (1) and (2) can accomplish the requirements of all three conditions with a much higher recovery than the safe operating point for the conventional inlet.

It can be shown that the safe operation level, point (3), of FIGURE 12 for a conventional inlet can cost up to 40% in fuel consumption to maintain the cruise thrust level of point (1). The effect on direct operating cost for a typical supersonic transport (SST) will depend upon the percentage of the mission that involves the safe operating level.

The self-restarting inlet of the present invention offers at least 30% better specific fuel consumption for operation at a safe operation point, i.e., restartable condition in turbulent air. The use of this inlet principle promises very worthwhile reductions in operating costs for such supersonic passenger aircraft. An intangible benefit is the improved passenger acceptance and possible increased load factors through use of the self-restarting inlet on an SST.

Inlet stability is a primary requisite for the SST and is also very important for supersonic military vehicles. It can also be shown that a one percent loss in pressure recovery will result in an 0.5–0.8 percent increase in direct operating cost for the SST. Some SST airframe designers have proposed the use of all external compression inlets, thereby accepting a loss of several percent pressure recovery and a cowl drag penalty, to eliminate the problem of inlet unstarting and restarting. The present invention provides inlet stability and flight safety at a higher pressure recovery, lower drag and lower total inlet weight in comparison to present state of the art inlet configurations.

While the particular details set forth above and in the drawings are fully capable of attaining the objects and providing the advantages herein stated, the structure and method thus disclosed are merely illustrative and could be modified or varied to produce the same results without departing from the scope of the inventive concept as defined in the appended claims.

I claim:

1. In a supersonic vehicle having an air breathing engine for propulsion:
   an elongate duct formed by a plurality of walls for ingesting external air flowing at supersonic velocity relative to said vehicle and compressing and conducting said ingested air to said engine,
   said duct having an external air inlet opening formed with a first edge adapted to produce a first shock wave oblique to the prevailing direction of said supersonic external airflow and external to said duct,
   said external air inlet opening further having a second edge adapted to produce a second shock wave oblique to said external airflow direction and within said duct,
   said duct further having a varying cross-sectional area geometry with a throat section of minimum area less than the cross-sectional area of said inlet opening and downstream from said first and second shock waves for producing a terminal shock wave substantially normal to the prevailing direction of said ingested airflow through said throat section, and
   means for separating the boundary layer of said ingested air from one of said duct walls to aerodynamically decrease the effective flow area at the inlet opening to a lesser area than that defined by the actual air inlet opening whereby the effective internal contraction ratio may be increased sufficiently to permit restarting of the inlet.

2. The structure set forth in claim 1 above, wherein:
said separating means comprises perforations in a portion of a wall of said duct for applying pressure to the surface of said wall portion contacted by said boundary layer.

3. The structure set forth in claim 2 above, wherein:
said separating means further comprises at least one plenum chamber for applying said pressure through said perforations from the surface of said wall portion opposite from said boundary layer surface.

4. The structure set forth in claim 3 above, further including:
means communicating variations of pressure in said duct proximate said throat section to said plenum chamber for varying said applied pressure through said perforations.

5. An engine air inlet duct for gathering air at supersonic flow, said inlet duct comprising:
an external air inlet opening,
an external compression surface projecting externally of said inlet duct opening create oblique shocks which partially decelerate and compress ingested flow,
internal contoured ramps within said inlet duct including a throat section of minimum cross-sectional flow area to create further oblique shock compression to a Mach number near unity proximate said throat section,
a surface boundary layer displacement system for separating the boundary layer of the ingested flow from said external compression surface, said system consisting of:
 a porous boundary layer bleed surface area in said inlet duct downstream from said external compression surface,
 at least one plenum chamber communicating with said porous area, and
 means communicating with said plenum chamber and said external compression surface for injecting into the boundary layer air on said external compression surface air at a higher pressure than that of the boundary layer air to separate the boundary layer from the external compression surface and thereby create an effective ingested air flow path of a lesser area than that defined by the actual external air inlet opening.

6. A self-restarting mixed compression engine air inlet system for an engine of a supersonic vehicle comprising:
an air inlet opening for admitting external air into said system,
an elongate duct communicating said inlet opening to said engine,
at least one fixed ramp projecting forwardly of said inlet opening forming a portion of a wall of said duct,
at least one movable ramp extending rearwardly of said fixed ramp forming a portion of the wall of said duct,
said fixed ramp and the forward portion of said movable ramp forming an external compression surface, and
means for injecting air into the boundary layer air on a portion of said external compression surface at a higher pressure than that of the boundary layer air to cause such boundary layer air to separate from the compression surface and thereby create an aerodynamic flow path of lesser cross-sectional area than the flow path defined by the duct inlet and to generate additional oblique shock waves and spill excess air flow.

7. An engine-air inlet system for an engine as set forth in claim 6 wherein:
said external compression surface includes a porous section for boundary layer control, and said air injecting means comprises means for creating a flow of air outwardly through said porous ramp section into the engine inlet airflow when the inlet system is unstarted.

8. The structure set forth in claim 7 above, wherein:
said flow of air outwardly through said porous ramp section comprises boundary layer bleed air removed from a portion of a downstream ramp.

9. An engine-air inlet duct comprising:
an elongate duct for ingesting air flowing at supersonic velocity,
shock wave means formed on said duct for producing a succession of oblique shock waves in said ingested air,
throat section means formed on said duct for producing a terminal normal shock wave proximate and downstream from said throat section, and
means for sensing increases of boundary layer pressure produced downstream of said normal shock wave to the boundary layer on a portion of said duct upstream of said normal shock wave to separate the upstream boundary layer from said duct portion and aerodynamically create a flow path of a lesser area than the flow path defined by said duct whereby the effective contraction ratio of the inlet duct is increased sufficiently to permit restarting of the inlet while the actual physical geometric contraction ratio of the duct is less than the contraction ratio required for restarting.

10. A method of controlling the location of a terminal normal shock wave in an engine-air inlet duct for a supersonic vehicle, said shock wave being situated proximate the throat of said duct in a steady state started flow condition, said method comprising:
sensing increases of boundary layer pressure produced downstream of said normal shock wave on a portion of said duct when said shock wave becomes unstarted and moves upstream of said throat, and
communicating said sensed increase in boundary layer pressure downstream of said normal shock wave to the boundary layer on a portion of said duct upstream of said normal shock wave to separate the upstream boundary layer from said duct portion and aerodynamically create a flow path of less area than the flow path defined by said duct whereby the effective contraction ratio of the inlet duct is increased sufficiently to permit restarting of the inlet while the actual physical geometric contraction ratio of the duct is less than the contraction ratio required for restarting.

11. The structure set forth in claim 4 above wherein the pressure in said plenum chamber is applied to the forward end of said perforated wall portion to cause separation of the boundary layer and produce additional external oblique shock waves to spill some of the air flow and aerodynamically reduce the effective flow area at the inlet lip.

References Cited

UNITED STATES PATENTS

| | | | |
|---|---|---|---|
| 2,638,738 | 5/1953 | Salter | 60—240 |
| 2,931,167 | 4/1960 | Leduc | 137—15.1 |
| 2,966,028 | 12/1960 | Johnson et al. | 137—15.1 |
| 2,969,939 | 1/1961 | Sulkin et al. | 244—53 |
| 3,054,255 | 9/1962 | Stratford | 137—15.1 |
| 3,067,578 | 12/1962 | Goodall et al. | 138—45 |
| 3,163,981 | 1/1965 | Goodall et al. | 137—15.2 |
| 3,175,355 | 3/1965 | Knauer | 137—15.1 |

CARLTON R. CROYLE, *Primary Examiner.*